(12) United States Patent
Yamane

(10) Patent No.: US 7,609,321 B2
(45) Date of Patent: Oct. 27, 2009

(54) SURVEILLANCE TELEVISION CAMERA

(75) Inventor: Akira Yamane, Nagoya (JP)

(73) Assignee: Elmo Co., Ltd., Aichi (JP)

( * ) Notice: Subject to any disclaimer, the term of this patent is extended or adjusted under 35 U.S.C. 154(b) by 546 days.

(21) Appl. No.: 11/114,413

(22) Filed: Apr. 26, 2005

(65) Prior Publication Data

US 2006/0050150 A1    Mar. 9, 2006

(30) Foreign Application Priority Data

Sep. 6, 2004    (JP) .............................. 2004-258158

(51) Int. Cl.
H04N 5/225    (2006.01)
H04N 7/18    (2006.01)

(52) U.S. Cl. ...................................... 348/373; 348/151

(58) Field of Classification Search ................. 348/143, 348/151–155, 373–376; 396/419, 427, 428
See application file for complete search history.

(56) References Cited

U.S. PATENT DOCUMENTS

| 4,320,949 | A | * | 3/1982 | Pagano ....................... 396/427 |
| 6,027,257 | A | * | 2/2000 | Richards et al. ............. 396/428 |
| 6,234,691 | B1 | * | 5/2001 | Jones et al. ................. 396/427 |
| 2004/0218043 | A1 | * | 11/2004 | Robinson .................... 348/151 |

* cited by examiner

Primary Examiner—Timothy J Henn
(74) Attorney, Agent, or Firm—William L. Androlia; H. Henry Koda

(57) ABSTRACT

A surveillance television camera includes a base mounted on an installation surface, a rotating disc rotatably mounted on the base, a tilt shaft mounted on the installation disc for holding the surveillance television camera, the tilt shaft and the rotating disc being remotely controlled so as to be rotated, and a protecting cover mounted on the base mounted on the installation surface so as to cover the camera.

11 Claims, 5 Drawing Sheets

F I G. 3
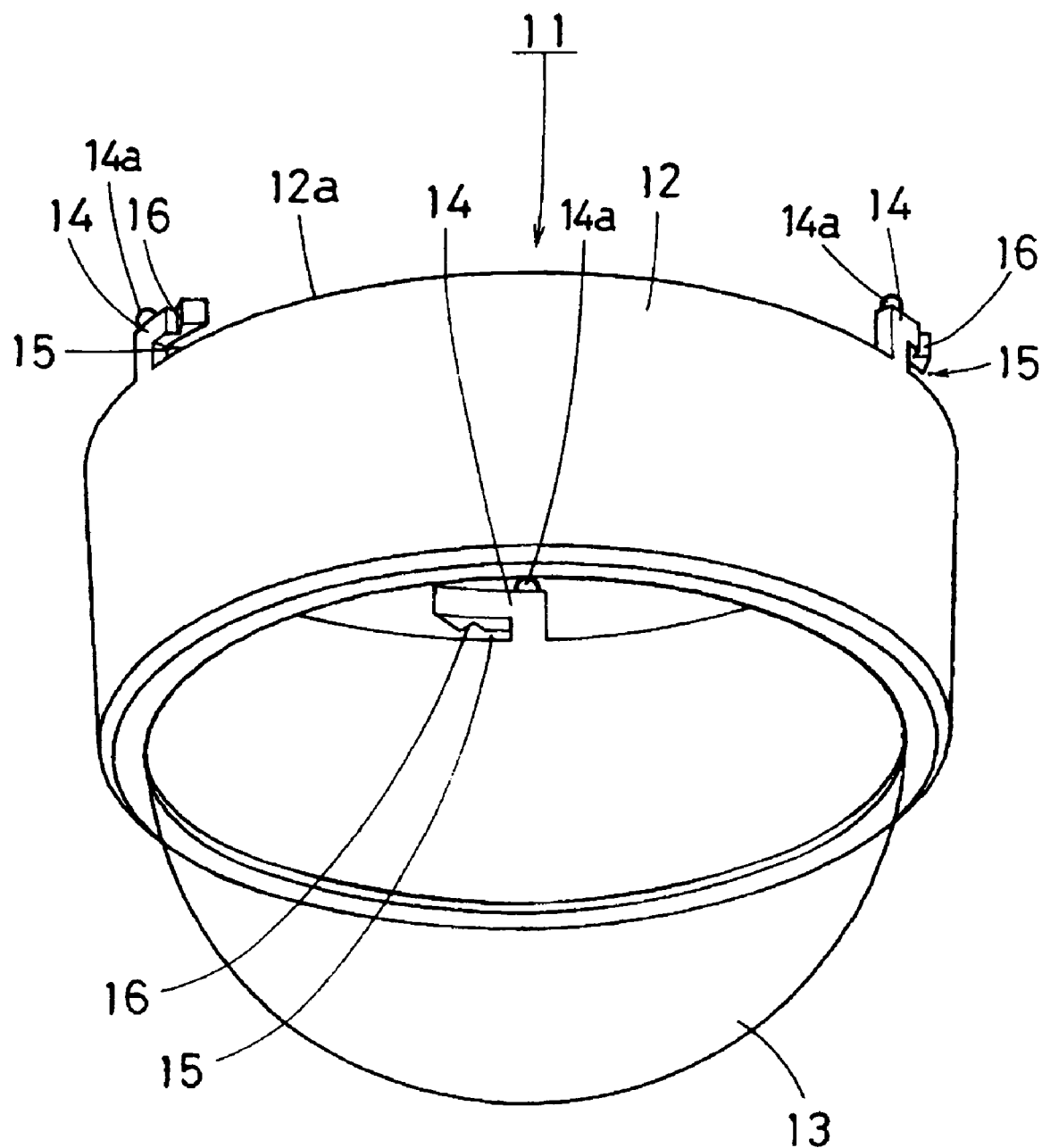

SURVEILLANCE TELEVISION CAMERA

BACKGROUND OF THE INVENTION

1. Field of the Invention

The present invention relates to a surveillance television camera.

2. Description of the Related Art

Conventional surveillance television cameras comprise a base mounted on an installation surface and a rotating disc rotatably mounted on the base. A tilt shaft for holding the surveillance television camera is mounted on the rotating disc. The rotating disc and tilt shaft are remotely controlled so as to be rotated. A protecting cover is sometimes mounted on the base to protect the surveillance television camera. Furthermore, a smoke cover is sometimes attached to the base so that the surveillance television camera becomes less conspicuous. On the other hand, the protecting cover is sometimes detached from the base in order that the visual field of the television camera may be enlarged.

In the conventional television cameras, however, the protecting cover and smoke cover cannot be detached while the base is kept mounted on the installation surface. Accordingly, the entire surveillance television camera is required to be detached from the installation surface every time the protecting cover or smoke cover is detached from the base.

SUMMARY OF THE INVENTION

Therefore, an object of the present invention is to provide a surveillance television camera in which the protecting cover can be attached to and detached from the base depending on purposes of use while the entire camera is maintained in a mounted state.

The present invention provides a surveillance television camera comprising a base mounted on an installation surface, a rotating disc rotatably mounted on the base, a tilt shaft mounted on the installation disc for holding the surveillance television camera, the tilt shaft and the rotating disc being remotely controlled so as to be rotated, and a protecting cover mounted on the base mounted on the installation surface so as to cover the camera.

According to the foregoing construction, the protecting cover is detachably attached to the base of the surveillance television camera installed on the installation surface. Consequently, since the protecting cover is attached to or detached from the base according to a purpose of use, convenience of the surveillance television camera can be improved.

In a preferred from, the surveillance television camera further comprises another cover detachably mounted on the base so as to cover a space defined between the base and the disc when the protecting cover is detached from the base. Consequently, dust can be prevented from entering through the space. Furthermore, since the base and the disc are continuous without any step therebetween, an appearance of the camera can be improved.

In another preferred form, the surveillance television camera further comprises a sensor detecting attachment or detachment of the protecting cover, thereby generating a signal. In this case, a rotational angle of the tilt shaft is changed to a previously set rotational angle on the basis of the signal generated by the sensor. Accordingly, when the protecting cover is detached and said another cover is attached, the tilt shaft is changed to a larger rotational angle which can enlarge the visual field of the camera. On the other hand, when said another cover is detached and the protecting cover is attached, the tilt shaft is changed to a smaller rotational angle which reduces the visual field of the camera. Consequently, an image can be prevented from distortion by a curvature of the protecting cover and the surveillance television camera can be used efficiently.

In further another preferred form, each cover is detachably attached to the base by bayonet connection. Consequently, each cover can be attached and detached simply and easily.

BRIEF DESCRIPTION OF THE DRAWINGS

Other objects, features and advantages of the present invention will become clear upon reviewing the following description of the embodiment with reference to the accompanying drawings, in which:

FIG. 3 is a perspective view of the dome cover;

DETAILED DESCRIPTION OF THE INVENTION

Figure 1:
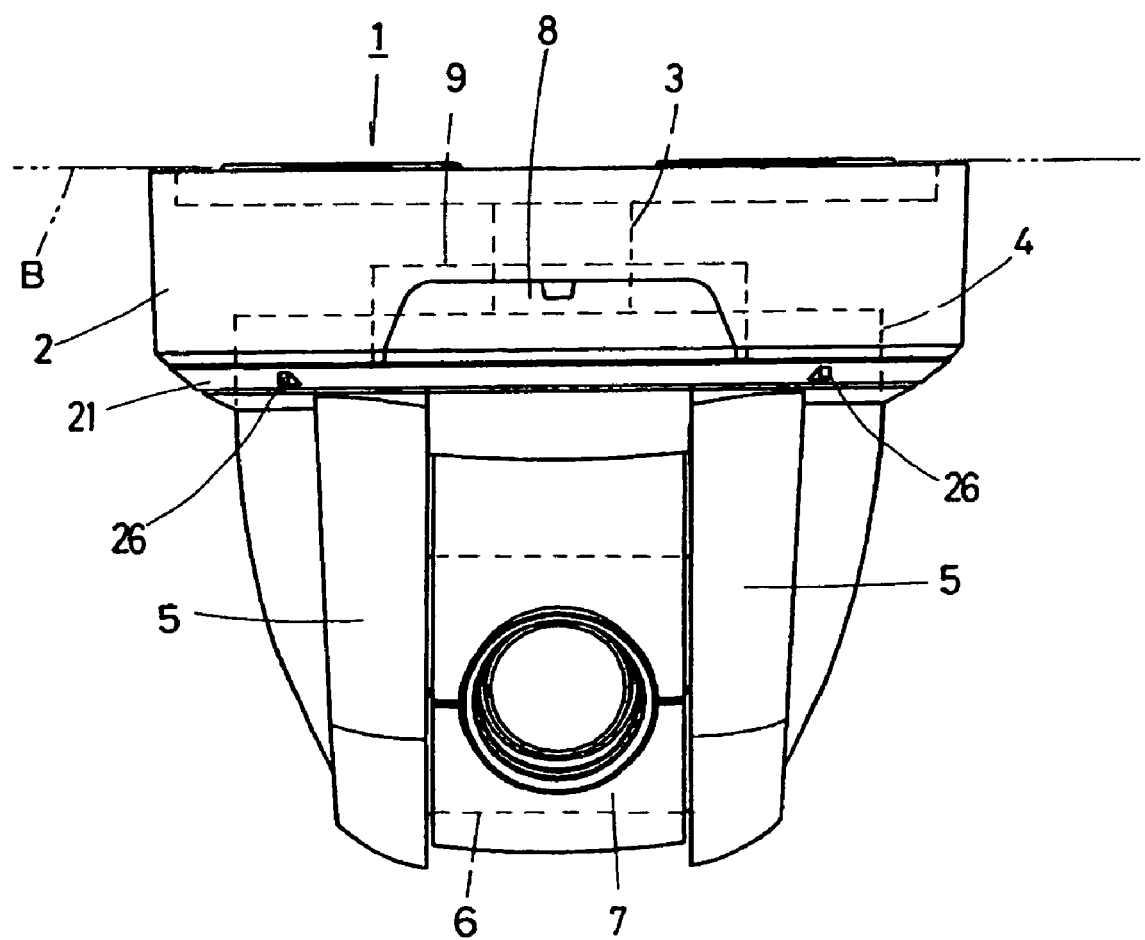
FIG. 1 is a front view of a surveillance television camera of one embodiment in accordance with the present invention, in which view a cover is detached.

One embodiment of the present invention will be described with reference to the accompanying drawings. Referring to FIG. 1, a surveillance television camera of the embodiment is shown. A generally cylindrical base 2 is mounted on an installation face B provided on a ceiling or the like. A rotating shaft 3 is provided in the base 2. The rotational shaft 3 is driven by a driving mechanism (not shown) including a stepping motor so as to be rotated in a normal or reverse direction by a predetermined angular range. A disc 4 is fixed to the rotational shaft 3. A pair of shaft-supporting brackets 5 are provided on the disc 4.

A tilt shaft 6 is supported between the brackets 5 so as to be perpendicular to the rotational shaft 3. A surveillance television camera 7 which will hereinafter be referred to as "camera" is fixed to the tilt shaft 6. The tilt shaft 6 is driven by a driving mechanism (not shown) including a stepping motor so as to be rotated in a normal or reverse direction by a predetermined angular range. As a result, a visual field of the camera 7 in the tilt direction is defined. The stepping motors driving the respective shafts 3 and 6 are controlled by a control circuit 9 including a receiver 8 receiving a control signal delivered from a remote controller (not shown). A television image obtained by the camera 7 is supplied via a signal cable (not shown) to be displayed on a surveillance monitor.

Figure 2:
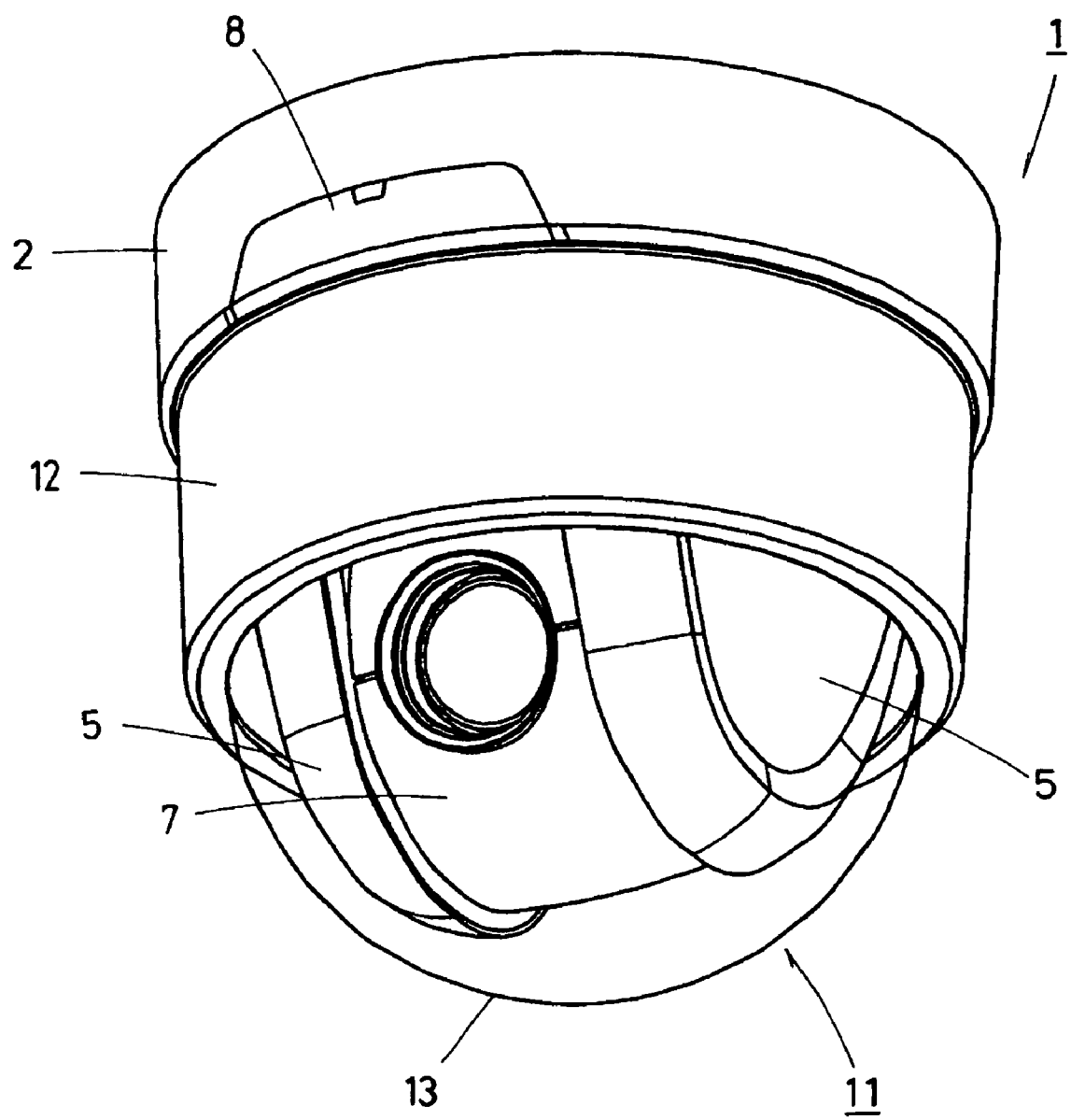
FIG. 2 is a perspective view of the surveillance television camera with a dome cover attached thereto.

The surveillance television camera 1 is used with a dome cover 11 detached as shown in FIG. 1. The dome cover 11 serves as a protecting cover. In this case, the visual field is increased. Alternatively, the surveillance television camera 1 is used with the dome cover 11 attached as shown in FIG. 2. The dome cover 11 includes a translucent cylindrical portion 12 and a transparent dome-shaped portion 13. The dome cover 11 may be a smoke cover which is attached to the base so that the surveillance television camera becomes less conspicuous.

Referring to FIG. 3, the cylindrical portion 12 of the dome cover 11 has an end surface 12a formed with three engagement pieces 14 spaced by 120 degrees from one another. Each engagement piece 14 has an engagement groove 15 formed to be in parallel to the end surface 12a. Each engagement piece 14 has a circumferential distal end formed with a lock recess 16. Each engagement piece 14 has a protrusion 14a formed integrally therewith. The protrusions 14a turns on and off a limit switch LS detecting attachment or detachment of the dome cover 11.

Figure 4:
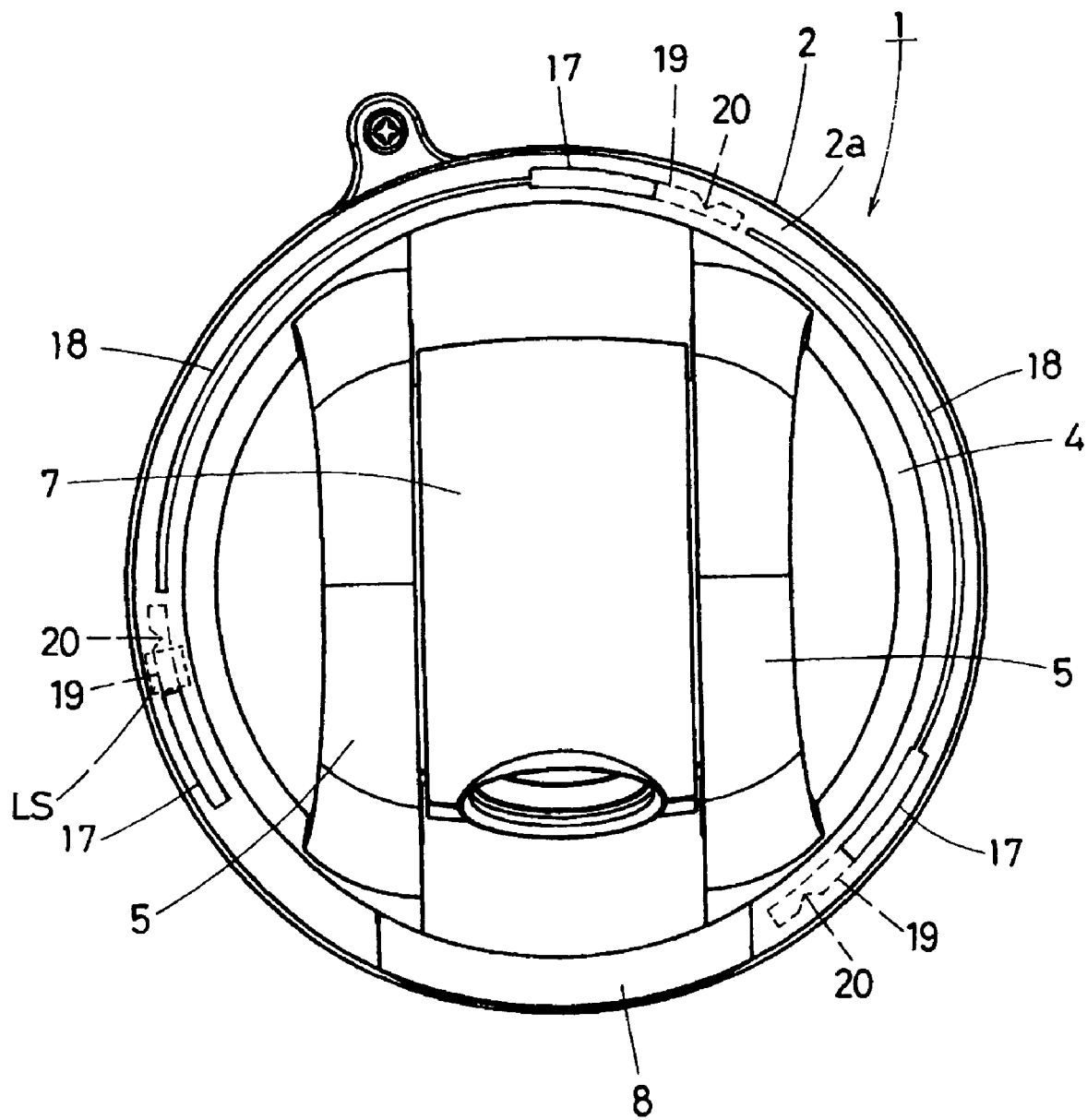
FIG. 4 is a bottom view of the surveillance television camera with the cover detached.

Referring to FIG. 4, the base 2 includes a dome cover attachment surface 2a having three engagement holes 17 spaced by 120 degrees from one another. The engagement pieces 14 of the dome cover 11 are adapted to engage the engagement holes 17 respectively. Two of the three engagement holes 17 are continuous to arc fitting grooves 18 formed so as to keep away from the receiver 8. Each engagement hole 17 has an engagement groove 19 formed in the underside of the attachment surface 2a so as to extend in the direction opposite to the fitting grooves 18. Each engagement piece 14 is adapted to engage the engagement groove 19. Each engagement groove 19 has a locking protrusion 20 formed in an inner end thereof so as to be fitted in the lock recess 16. The limit switch LS is fixed to the base 2 so as to correspond to the engagement groove 19 of any one of the engagement holes 17.

When the dome cover 11 is to be mounted on the dome cover attachment surface 2a, the engagement pieces 14 are engaged with the engagement holes 17 respectively and the dome cover 11 is rotated so that the attachment surface 2a is fitted into the engagement grooves 15 and the engagement pieces 14 are engaged with the engagement grooves 19 respectively. This operation is referred to as bayonet connection. In this case, the locking protrusions 20 of the engagement grooves 19 are fitted into the lock recesses 16, whereby the engagement pieces 14 are prevented from falling off.

The limit switch LS is turned on and off by the protrusion 14a engaging the groove 19 in which the limit switch is provided, whereby attachment or detachment of the dome cover 11 to and from the base 2 is detected. The ON-OFF signal generated by the limit switch LS are supplied to the control circuit 9. Based on the supplied signal, the control circuit 9 changes a rotational angle of the tilt shaft 6 to a previously set value.

The rotational angle of the tilt shaft 6 is set so as to be smaller when the dome cover 11 is attached to the base 2 than when the dome cover 11 is detached from the base 2 and the cover 21 is attached to the base 2. Consequently, an image obtained by the camera is prevented from being distorted by the curvature of the dome-shaped portion 13. The tilt shaft 6 is adapted to be set to such a rotational angle as to enlarge the visual field when the dome cover 11 is detached from the base 2.

Figure 5:
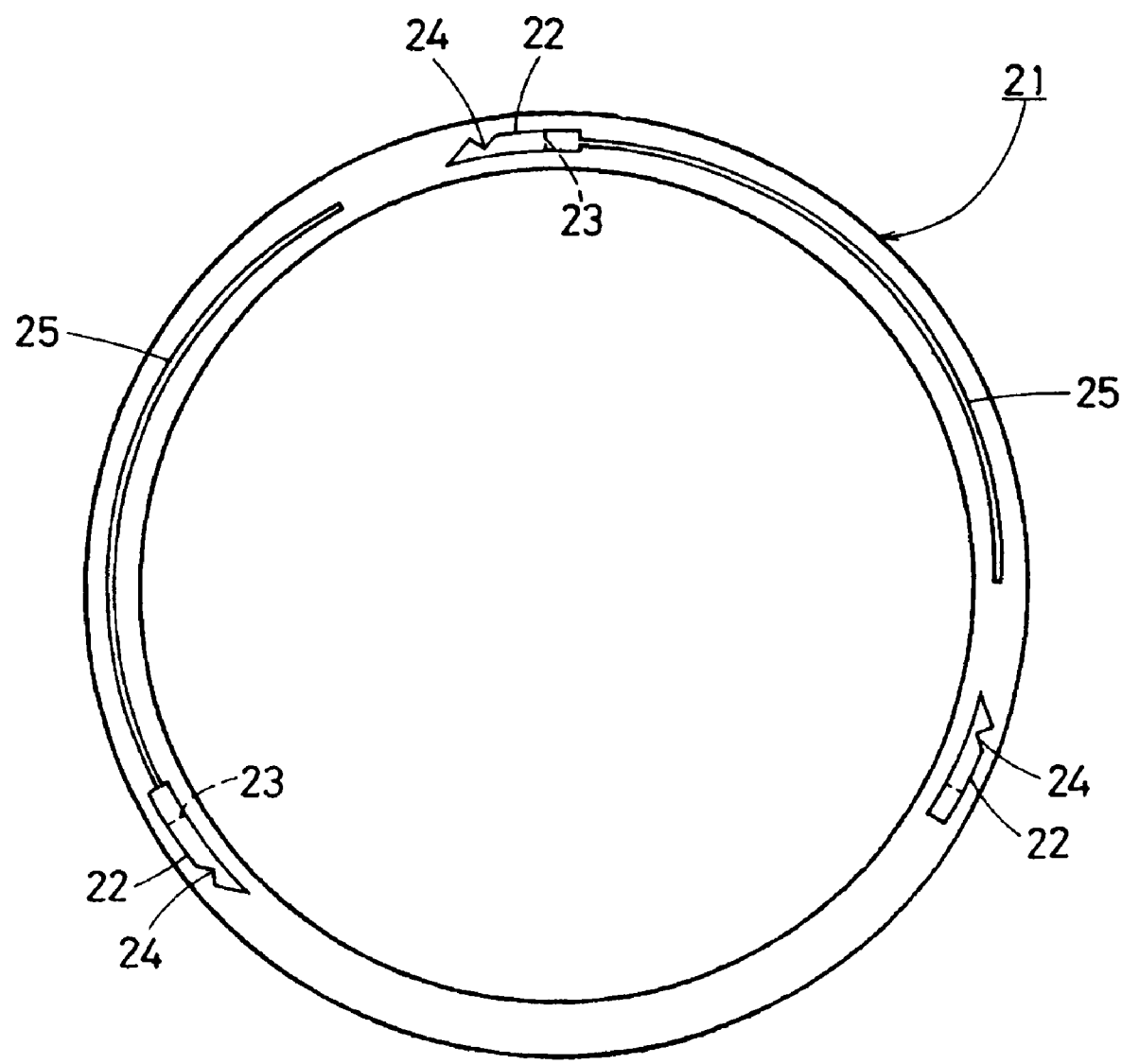
FIG. 5 is a rear view of the cover.

When the dome cover 11 is detached from the base 2, the engagement holes 17 and fitting grooves 18 both formed in the attachment surface 2a between the base 2 and the disc 3 are exposed. Furthermore, a step is formed between the base 2 and the disc 3. Accordingly, a ring-shaped cover 21 is attached to the base 2 as shown in FIG. 5. The cover 21 has three engagement pieces 22 corresponding to the engagement holes 17 formed in the dome cover attachment surface 2a respectively. The engagement pieces 22 have the same shape as the engagement pieces 14 of the cover 11 except for provision of the protrusions 22. The engagement pieces 22 are formed with the engagement grooves 23 and engagement recesses 24. Two of the three engagement grooves 23 are continuous to arc-shaped fitting protrusions 25 fitted into the arc-shaped fitting grooves 18 respectively.

When the cover 21 is to be attached to the attachment surface 2a of the base 2, the engagement pieces 22 are engaged with the engagement holes 17 of the base 2 respectively and the cover 21 is rotated so that the dome cover attachment surface 2a is fitted into the engagement grooves 23 of the engagement pieces 22 and the engagement pieces 22 are engaged with the engagement grooves 19, in the same manner as the dome cover 11. This operation is referred to as bayonet connection. The cover 21 has a finger hook protrusion 26 which renders the rotation relative to the base 2 easier.

According to the foregoing embodiment, the dome cover 11 covering the camera 7 is detachably attached to the base 2 of the surveillance television camera installed on the installation surface B. Consequently, since the dome cover 11 is attached to or detached from the base 2 according to a purpose of use, convenience of the surveillance television camera can be improved. Furthermore, when the dome cover 11 has been detached, the cover 21 detachably attached to the base 2 covers the space between the base 2 and the disc 3. Consequently, dust can be prevented from entering through the exposed engagement holes 17 and arc grooves 18. Furthermore, since the base 2 and the disc 4 are continuous without any step therebetween, an appearance of the camera can be improved.

Furthermore, the rotational angle of the tilt shaft 6 is carried out automatically on the basis of attachment or detachment of the dome cover 11. When the dome cover 11 is detached and the cover 21 is attached, the tilt shaft 6 is changed to a smaller rotational angle reducing the visual field. Consequently, an image obtained by the camera is prevented from being distorted by the curvature of the dome-shaped portion 13 and the surveillance television camera can be used efficiently. Furthermore, since the bayonet connection is employed for attachment and detachment of the dome cover 11 and the cover 21 to and from the base 2, the attachment and detachment can be carried out simply and easily.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A surveillance television camera comprising:
   a base mounted on an installation surface;
   a rotating disc rotatably mounted on the base;
   a tilt shaft mounted on the installation disc for holding the surveillance television camera, the tilt shaft and the rotating disc being remotely controlled so as to be rotated; and
   a domed protecting cover mounted on the base mounted on the installation surface so as to cover the camera; and
   a means for setting and limiting a rotational angle of said tilt shaft to be smaller when the domed protecting cover is attached to said base than when said domed protecting cover is detached from said base, whereby distortion of an image from said surveillance television camera by curvature of said domed protecting cover is prevented when said domed protecting cover is attached.

2. The surveillance television camera according to claim 1, further comprising a dust protecting cover detachably mounted on the base so as to only cover a space defined between the base and the disc when the domed protecting cover is detached from the base, whereby dust is prevented from entering the surveillance television camera when the domed protective cover is detached.

3. The surveillance television camera according to claim 1, further comprising a sensor detecting attachment or detachment of the domed protecting cover, thereby generating a signal, wherein a rotational angle of the tilt shaft is set and limited to a previously set rotational angle on the basis of the signal generated by the sensor.

4. The surveillance television camera according to claim 2, further comprising a sensor detecting attachment or detachment of the domed protecting cover, thereby generating a signal, wherein said rotational angle of the tilt shaft is set and limited to a previously set rotational angle on the basis of the signal generated by the sensor.

5. The surveillance television camera according to claim 1, wherein each of said domed and dust protecting cover is detachably attached to the base by bayonet connection.

6. The surveillance television camera according to claim 2, wherein each of said domed and dust protecting cover is detachably attached to the base by bayonet connection.

7. The surveillance television camera according to claim 3, wherein each of said domed and dust protecting cover is detachably attached to the base by bayonet connection.

8. The surveillance television camera according to claim 4, wherein each of said domed and dust protecting cover is detachably attached to the base by bayonet connection.

9. The surveillance television camera according to claim 5, wherein said domed protecting cover comprises a translucent cylindrical portion and a transparent dome-shaped portion and said bayonet connection is provided on said translucent cylindrical portion.

10. The surveillance television camera according to claim 3, wherein said sensor comprises a limit switch on said base and a protrusion on said cylindrical portion of said protective cover wherein said protrusion engages said limit switch when said protective cover is attached to said base.

11. The surveillance television camera according to claim 2, wherein said dust protecting cover is ring shaped.

* * * * *